United States Patent [19]
Mitchell

[11] Patent Number: 5,843,263
[45] Date of Patent: Dec. 1, 1998

[54] METHOD FOR APPLYING GRAPHICS TO LEATHER SURFACES AND THE LIKE

[76] Inventor: Larry S. Mitchell, 5720 McKinley Dr., Garden Valley, Calif. 95633

[21] Appl. No.: 612,296

[22] Filed: Mar. 7, 1996

Related U.S. Application Data

[63] Continuation-in-part of Ser. No. 300,321, Sep. 2, 1994, Pat. No. 5,534,100.

[51] Int. Cl.⁶ .................................................. B44C 1/165
[52] U.S. Cl. ........................ 156/230; 156/340; 156/344; 156/583.3
[58] Field of Search ..................................... 156/230, 234, 156/289, 299, 323, 240, 320, 249, 330.9, 344, 540, 493, 366, 378, 583.3

[56] References Cited

U.S. PATENT DOCUMENTS

| | | | |
|---|---|---|---|
| 2,855,338 | 10/1958 | Mulkey | 154/104 |
| 4,061,516 | 12/1977 | George et al. | 156/94 |
| 4,271,224 | 6/1981 | Mizuno et al. | 428/207 |
| 4,342,614 | 8/1982 | Vanden Bergh | 156/341 |
| 4,392,905 | 7/1983 | Boyd et al. | 156/235 |
| 4,530,872 | 7/1985 | Pernicano | 428/200 |
| 4,597,812 | 7/1986 | Hamilton | 156/63 |
| 4,657,803 | 4/1987 | Pernicano | 428/200 |
| 4,766,032 | 8/1988 | Pernicano | 420/325 |
| 4,911,734 | 3/1990 | Short | 8/471 |
| 5,019,193 | 5/1991 | Aramini | 156/64 |

*Primary Examiner*—Merrick Dixon
*Attorney, Agent, or Firm*—Malin, Haley, Dimaggio & Crosby, PA

[57] ABSTRACT

A system, including an apparatus and method, for on-site application of graphics to synthetic and non-synthetic cushion backed surfaces, such as leather, vinyl and the like, as found on vehicle seats, without removing the surface from the seat or requiring insertion of a rigid backing surface. The apparatus including a registration means, an adjustable clamping means, a pressure guage, an electrically heated tool having a removable tool head with a thermally conductive working surface and a graphic impression die mounted thereon. The method including the application of graphic designs to leather like surfaces utilizing the disclosed apparatus.

9 Claims, 4 Drawing Sheets

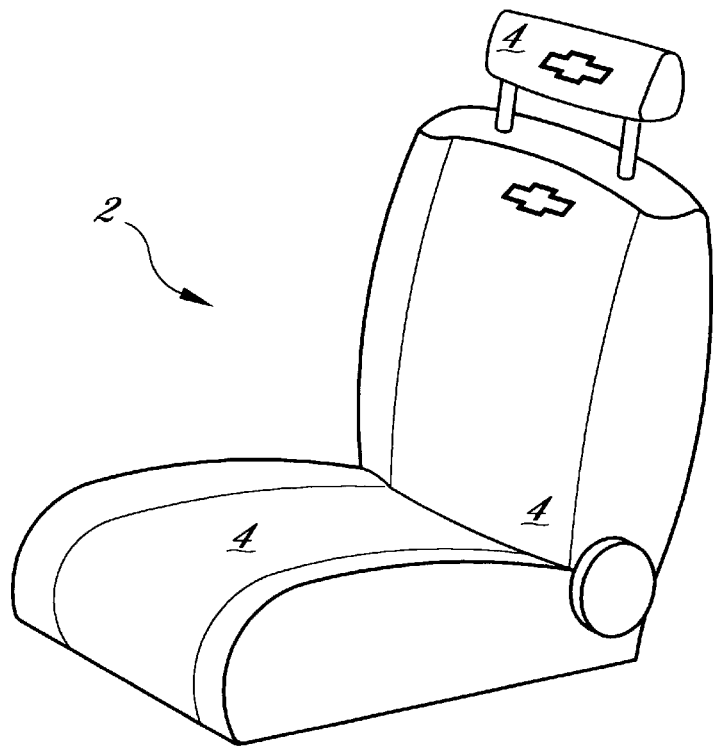
Fig. 2
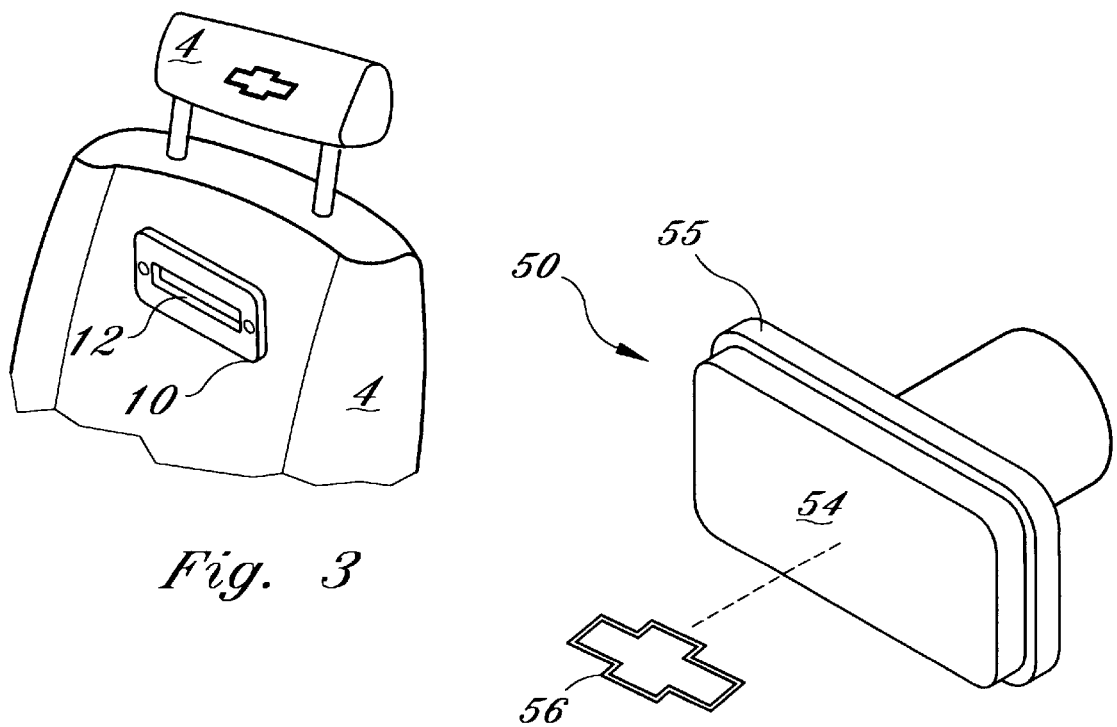
Fig. 3
Fig. 8

METHOD FOR APPLYING GRAPHICS TO LEATHER SURFACES AND THE LIKE

Continuation-In-Part of Ser. No. 08/300,321, filed Sep. 2, 1994, and entitled Portable Method and Apparatus for the Application of a Flock Material Graphic to a Fabric Surface U.S. Pat. No. 5,534,100.

BACKGROUND OF THE INVENTION

1. Field of the Invention

This invention relates generally to a method and apparatus for on-site graphic marking of various materials, and particularly to a method and portable apparatus for applying graphic designs on natural or synthetic leather and the like, such as the material found on automobile and boat seats.

2. Description of the Prior Art

The desirability of affixing decorative graphics, such as letters or logos, to fabric, leather, and vinyl surfaces is well known. Typically, the graphic design is sewn or stitched on if the material (e.g. leather) can be fed into a sewing machine. Often, however, it is not possible to feed the material into a sewing machine, as, for example, when the material has already been fixed or transformed into a final product such as an automobile seat.

Heretofore, the permanent application of such graphic designs has been a complex problem requiring that the seat be removed from the vehicle and transported to an operational site where high pressure applicators are used to transfer the graphic design to the material's surface. This costly and time consuming process limits the application of graphic designs to vehicle seat covers and the like despite a strong demand for the application of such designs.

Several methods are known in the art for attaching labels to cloth surfaces utilizing various heat transfer devices. For example, U.S. Pat. No. 3,793,112, issued to Sontag et al., discloses a hand held label attaching iron for applying a label onto a garment. U.S. Pat. No. 4,342,614, issued to Vanden Bergh, discloses a hand-held pressure applicator for transferring pressure transferable graphic images from an accepting tape to a receptor surface. U.S. Pat. No. 4,597,812, issued to Hamilton, discloses a method of joining articles, especially fabrics and the like, adhesively by applying heat and pressure through a reusable polytetrafluoroethylene. These devices and methods, however, are limited to the application of graphics to flat fabric surfaces. Furthermore, since these devices and methods rely on the application of heat by pressure, they are not suitable for use on non-flat cushioned surfaces as found on an automobile seat.

Furthermore, the instant inventor has developed a portable method and apparatus for the application of a flock material graphic to a fabric surface which is the subject of U.S. Pat. Ser. No. 08/300,321 which disclosure is directed to applying graphics to cloth surfaces and which is incorporated herein by reference.

U.S. Pat. No. 2,855,338, issued to Mulkey, discloses a method of mending vinyl plastic upholstered seats. Mulkey, however, teaches a method directed to repairing torn vinyl seats, and does not teach the application of graphic designs to the surface of undamaged vinyl surfaces. In addition, when working on a vehicle seat, Mulkey teaches removing the material from the seat upon which it is normally installed, or unfastening the material to permit access to the underside of the material. As previously mentioned, removing or unfastening the seat material is undesirable.

Similarly, U.S. Pat. No. 4,061,516, issued to George et al., teaches a patching technique for repairing defects or damage in a decorative surface.

Furthermore, with cushioned surfaces the application of graphic images is problematic as application of the appropriate pressure when using thermally sensitive marking films is difficult as the application of too much pressure results in a blurred image, while the application of not enough pressure results in an incomplete image transfer.

While the aforementioned devices and methods disclose various means for applying graphic designs to certain surfaces, the prior art is not suitable for applying graphic designs on non-flat, cushioned, leather and vinyl and the like, such as the material found on automobile and boat seats, while the material remains fixed to the seat structure in its finished form. The instant invention is directed to solve these problems that are not adequately resolved by the prior art.

SUMMARY OF THE INVENTION

The present invention discloses a system, including an apparatus and method, for on-site application of graphics to synthetic and non-synthetic cushion backed surfaces, such as leather, vinyl and the like, as found on vehicle seats, without removing the surface from the seat or requiring insertion of a rigid backing surface.

The apparatus consists of: a clamping means for clamping and compressing a soft surface, such as an automobile seat; a registration means for proper positioning, alignment and repeated registration of a tool head, said registration means defining a window for insertion of a tool head therein; a depth gauge means for determining when sufficient compression has been achieved; a tool head means having an impression plate mounted thereon; a tool handle means for mounting said tool head thereon and generating heat; and, various hand tools, adhesive compounds, heat sensitive tape, temperature monitoring and regulation devises, and a supply of, pigmented, thermally sensitive (heat transfer), graphic marking films in a variety of colors.

The apparatus is used in the practice of a method for transferring graphic markings on soft, contoured surfaces including the steps of: (a) positioning a registration means on an application surface, such as a portion of leather on an automobile seat; (b) securing said registration means in place utilizing an adjustable clamping means; (c) inserting a contoured depth gauge within the registration means window; (d) increasing the pressure exerted by the clamping means on the registration means until the contoured depth gauge indicates that the correct compression is achieved; (e) mounting a contoured impression means on a contoured tool head surface such that the impression means is centered and aligned; (f) mounting the tool head to a heat generating and heat supplying tool handle; (g) inserting a layer of thermally sensitive graphic marking material within the registration means window such that the application surface is overlaid; (h) inserting the tool head within the registration means window to a controlled, predetermined depth, while the tool head is heated to a predetermined temperature, for a predetermined time period; (i) removing the tool head, the thermally sensitive graphic marking material, the clamping means, and the registration means.

In accordance with the instant invention, it is an object thereof to provide an apparatus and method for applying graphic designs on soft cushioned leather or vinyl surfaces and the like.

It is a further object of the invention to provide an apparatus and method for applying graphic designs on soft cushioned surfaces, such as an automobile seat, with a compact apparatus such that the seat material does not have to be removed from the seat or the automobile.

Yet another object of the invention is to provide a system, including an apparatus and method, for the application of graphics to soft or cushioned surfaces utilizing thermally sensitive marking material and a heated image die, which controls the pressure exerted on the marking material thereby preventing image application problems associated with either too much, or not enough, pressure.

In accordance with these and other objects which will become apparent hereinafter, the instant invention will now be described with particular reference to the accompanying drawings.

BRIEF DESCRIPTION OF THE DRAWINGS

FIG. 2 depicts a perspective view of a vehicle seat having graphic designs applied thereto in accordance with the present invention.

FIG. 3 depicts a partial perspective view of an automobile seat and the positioning of a registration component of the instant invention thereon.

FIG. 8 depicts an exploded perspective view of the tool head of the instant invention.

DESCRIPTION OF THE PREFERRED EMBODIMENTS

The present invention discloses a system, including an apparatus and method, for on-site application of graphics to synthetic and non-synthetic cushion backed surfaces, such as leather, vinyl and the like, as found on vehicle seats, without removing the surface from the seat or requiring insertion of a rigid backing surface. The present invention, however, finds further use in the application of graphic designs to substantially flat, rigid backed, leather materials and the like.

Figure 1:
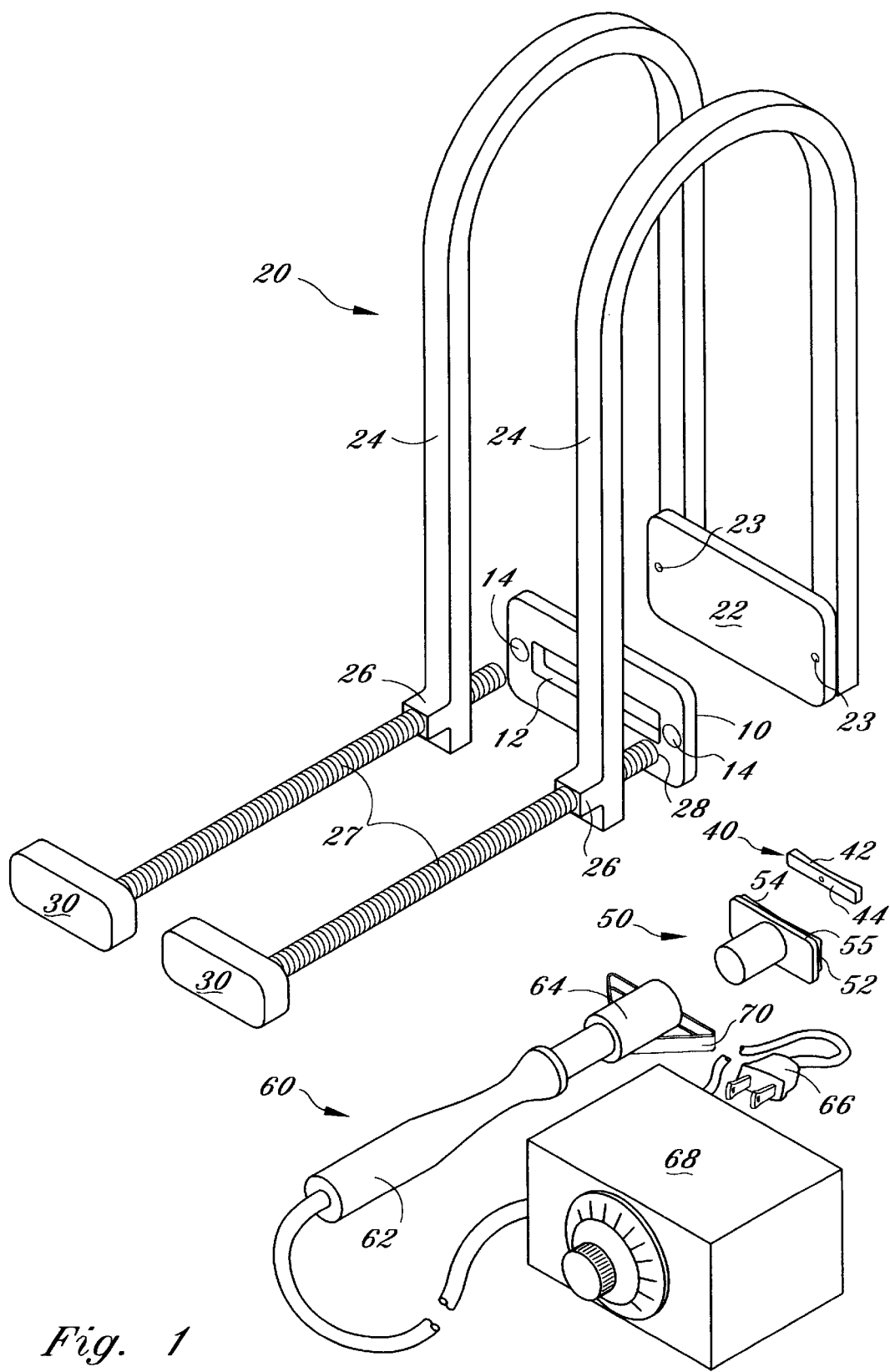
FIG. 1 depicts a perspective view of the apparatus of the present invention.

Turning to FIG. 1, the components of the instant invention are generally shown. The apparatus consists of the following components. A registration means 10 for proper positioning, alignment and repeated consistent registration of a tool head, said registration means defining a window 12 for insertion of a tool head therein. In the preferred embodiment the registration means is a rectangular registration plate of predetermined thickness and defining a registration window opening therein. The registration plate includes at least one, and preferably a pair of countersunk bores 14 therein for securing the registration plate to a substantially vertical surface by use of a clamping means for reasons soon to be apparent.

A clamping means, referenced generally as 20, for clamping and compressing a soft cushioned surface, such as an automobile seat, secures said registration plate firmly against the cushioned surface by compressive force. In the preferred embodiment, the clamping means includes a clamping support plate 22 having a pair of angularly extending, pivotally secured, arms 24 terminating in end portions 26 incorporating threaded apertures. Each of said end portion apertures receive an elongate threaded shaft 27 having a first end 28 corresponding in size to said registration plate bores for mating engagement therewith, and a second end incorporating a gripping means 30 for allowing a user to apply rotational torque to each of said shafts independently for making independent axial adjustments to each of said threaded shafts.

Figure 4:
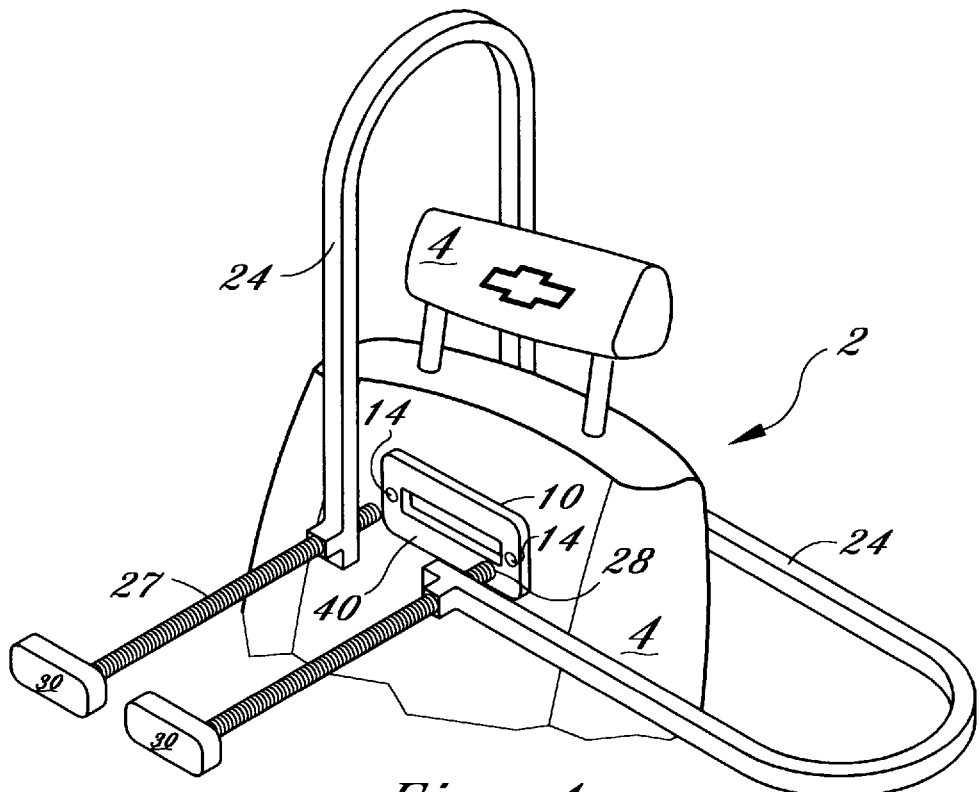
FIG. 4 depicts a partial perspective view of an automobile seat illustrating the positioning of the seat clamping component of the instant invention.
Figure 5:
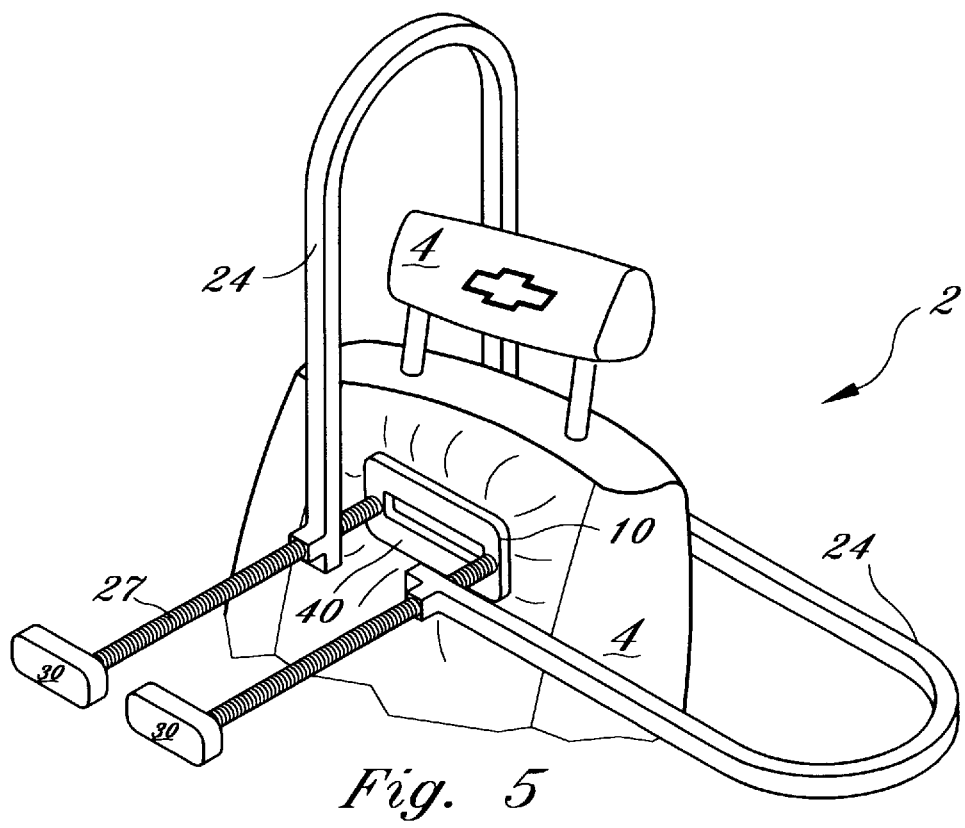
FIG. 5 depicts a partial perspective view of FIG. 4 illustrating the seat clamping component securing the registration component and further illustrating the depth gauge component.

In accordance with the present method, the registration plate 10 and clamping apparatus 20 are used for clamping and securing the registration plate on an a vertically oriented, cushioned leather or vinyl surface 4, such as that found on an automobile seat 2 as depicted in FIGS. 3–5. First, as best depicted in FIG. 3, the registration plate 10 is positioned adjacent the seat surface such that the registration window 12 frames the portion of the seat surface, typically a front surface, that is to receive a graphic application. Next, as best depicted in FIG. 4, the clamping apparatus 20 is positioned such that the support plate 22 is located is supporting position behind the seat 2, adjacent to the seat back. The angularly extending arms 24 thus extend from the support plate 22 around the seat such that the first end 28 of each threaded shaft 27 is in axial alignment with each of said registration plate bores 14. Alignment of the shaft ends 28 and the registration plate bores 14 is facilitated by the pivotal connection 23 of each arm to the support plate 22. The pivotal connection 23 of the arms is important to enable the clamping apparatus 20 to adapt to varying seat configurations and/or registration plate positions.

As best depicted in FIGS. 4 and 5, registration plate 10 is secured firmly in place by rotation of each threaded shaft 27 such that the first end 28 of each shaft is received in corresponding registration with a registration plate bore 14. Adjustment of the pressure applied to the registration plate is accomplished by user rotation of each shaft independently, such as by hand rotation of gripping means 30.

In applications involving soft substrates, it is important that the registration plate 10 apply an appropriate amount of pressure to the underlying cushioned material 4. For the proper application of graphics, it is important for the appropriate pressure to be applied so that the application material 4 protrudes into the registration window opening 12 a predetermined distance. As pressure is applied, the material framed by the registration window becomes non-planar, protruding into the registration plate window area. The applicant has found that applying an exact amount of pressure to the registration plate is important to the application of graphic designs. If too much pressure is applied, the material will protrude too far into the registration plate opening 12; similarly, if too little pressure is applied, the material will not protrude far enough into the registration plate opening 12. As is now apparent, these concerns are not present when the application involves a rigid material, or material backed by a rigid substrate. Therefore, for soft or cushioned materials, the present invention includes a depth gauge means, referenced generally as 40, for determining when sufficient compression has been achieved for soft substrate applications, such as applications involving vehicle seats 2.

In the preferred embodiment, directed to applications involving soft or cushioned substrates, the depth gauge means 40 comprises a rigid depth gauge plate sized for inserted mating engagement with said registration plate opening 12. The depth gauge plate 40 has a predetermined thickness, relative to the registration plate thickness for reasons that will soon become apparent, and, has a concave surface 42 and a flat surface 44. As depicted in FIG. 5, once the registration plate 10 is secured to an automobile seat by clamping means 20, depth gauge 40 is inserted into the registration plate window 12 such that the depth gauge concave surface 42 is in contact with the automobile seat material 4.

As is now apparent, the concave gauge surface generally conforms to the convexly protruding automobile seat material within the registration plate window. The thickness of the depth gauge and the thickness of the registration plate are such that an indication that the appropriate clamping pressure has been achieved results when the depth gauge flat surface 44 and the registration plate 10 are flush.

Thus, if upon insertion the depth gauge 40 becomes countersunk within the registration plate 10, additional clamping pressure is applied thereby causing the seat material to further protrude into the registration plate window 12 and forcing the depth gauge 40 toward a position flush with respect to the registration plate surface. Conversely, if, upon insertion, the depth gauge extends past the registration plate surface, clamping pressure is reduced thereby causing the seat material 4 to protrude to a lesser extent into the registration plate window 12 and allowing the depth gauge 40 to move to a position flush with respect to the registration plate surface.

The present invention further incorporates a tool head means 50 having an impression plate mounted thereon, and a hand held tool handle means 60 for mounting said tool head 50 thereon and for generating heat and regulating tool head temperature. Hand held tool 60 incorporates a gripping section 62 a tool head mounting section 64, and electric power cord 66 having a means for regulating 68 the power supplied to heating elements (not shown) disposed within tool head mounting section, and a tool stand 70. The means for regulating 68 comprises a voltage regulator connectable to an electric power source and electrically connected to said heating elements for enabling a user to vary the temperature of the heating elements, and, thus, the temperature of the graphic impression die.

Tool head 50 is removably mounted on the tool head mounting section 64 for practice of the instant method. Tool head has a working portion 52 sized for corresponding registration with the registration plate window 12. The tool head working portion may include a concave working surface 54 for use with soft substrates, or a flat working surface (not shown) for use with planar rigid substrates. Working surface 54 functions as a heat transfer plate and is made of a thermally conductive material. In any event, a die or impression plate 56, bearing a negative image of the graphic to be applied, for transferring a graphic image through the marking material is centrally mounted on the tool head working surface. The impression plate 56 may be secured to the tool head working surface 54 by any suitable fastening means such as heat tape (not shown). In an alternate embodiment, impression plate 56 may be formed as an integral part of working surface 54.

The tool head further incorporates and extending flange 55 which functions as a stop by engaging the registration plate when the tool head has been fully inserted in the registration plate window for preventing the application of excess pressure by the user.

Once the desired clamping pressure has been achieved the seat material within the registration plate window is pre-cleaned with a solvent such as trichloroethane. Once the seat material has been cleaned or otherwise suitably prepared, graphic marking film, such as thermally sensitive graphic marking foil (not shown), is inserted within the registration plate window and over the seat material, centered and smoothed. The present invention contemplates the use of any suitable graphic marking material for application by means of heat or pressure transfer.

Figure 6:
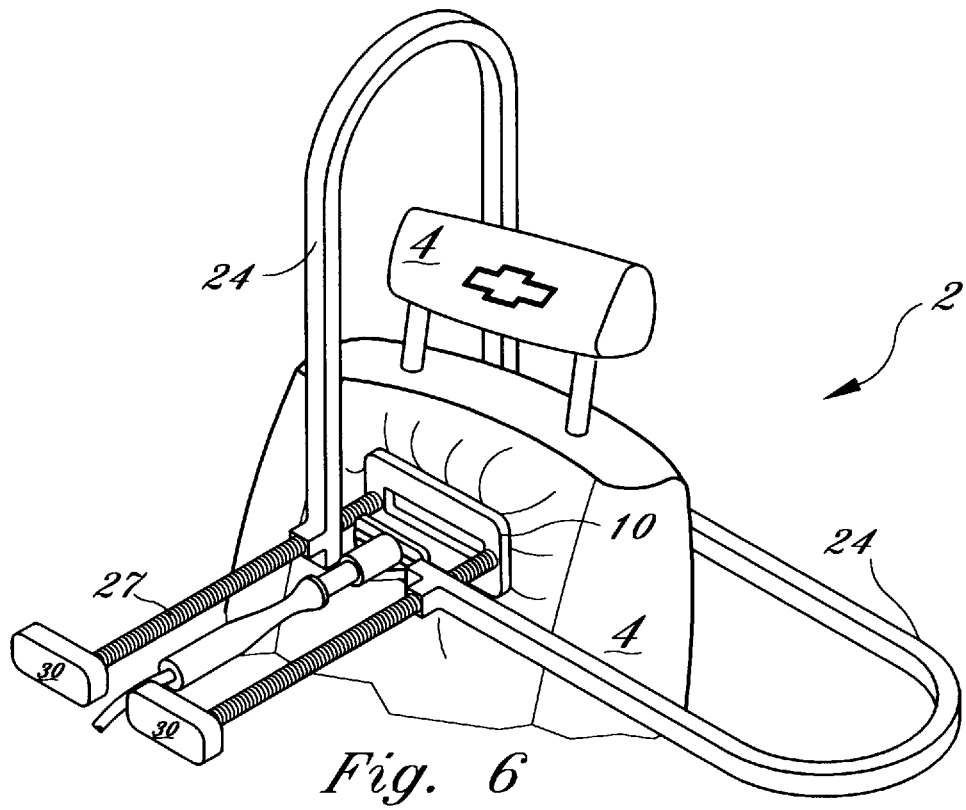
FIG. 6 depicts a partial perspective view of FIG. 5 and further introducing the hand tool component of the instant invention.
Figure 7:
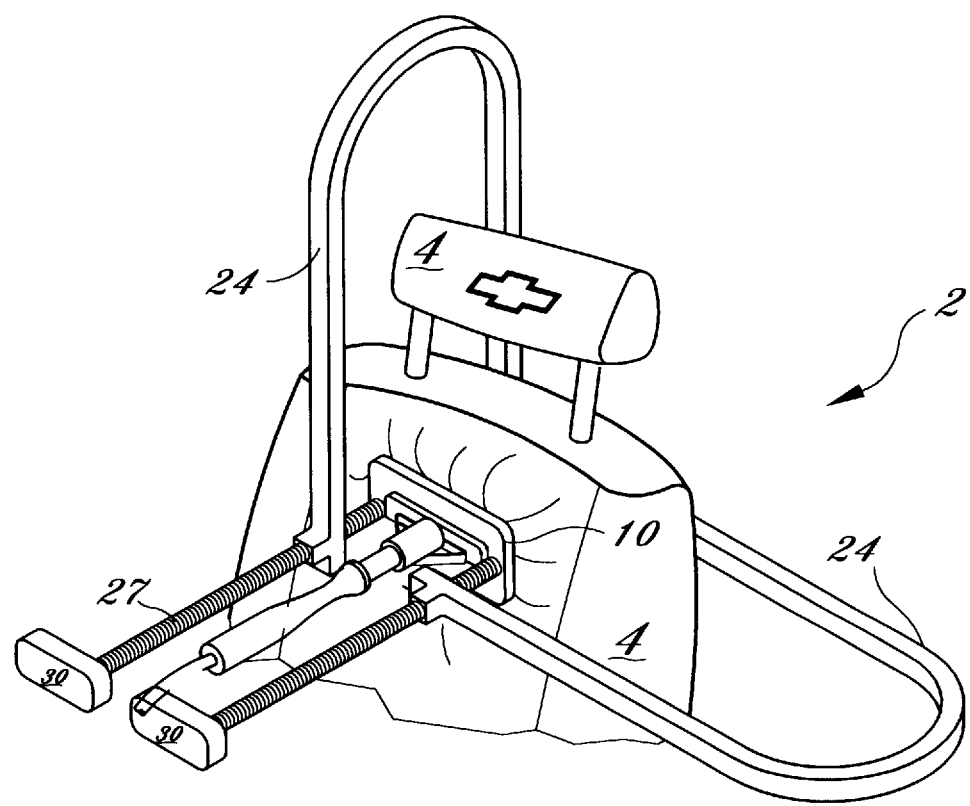
FIG. 7 depicts the partial perspective view of FIG. 6 illustrating insertion of the hand tool for applying graphic designs in accordance with the present invention.

As best depicted in FIGS. 6 and 7, graphic designs are transferred by inserting a heated tool head 50, having a selected graphic die thereon, into the corresponding registration plate window 12 until the tool head flange 55 contacts the registration plate 10 thereby preventing the user from exerting excessive force. The temperature of the tool head, and impression time, necessarily vary depending upon the marking material used. However, the applicant has found that heating the tool head 50 to approximately 240° F. and stamping for approximately ½ of one second, produces a satisfactory graphic transfer when using a particular type of foil marking material. If necessary, re-application is possible as the registration plate 10 assures a high degree of alignment between the impression bearing tool head 50 and the underlying material 4. As a result of the improved alignment re-application is possible if the first attempt proves unsatisfactory or the user is applying a multi-colored graphic which requires repeated stamping with different colored marking foils.

The equipment described herein is used in the practice of a method for transferring graphic markings on a prepared soft, surface including the following steps: (a) positioning the registration plate means on an application surface, such as a portion of leather on an automobile seat; (b) securing said registration means in place utilizing an adjustable clamping means; (c) inserting a depth gauge within the registration means window; (d) increasing the pressure exerted by the clamping means on the registration plate until the contoured depth gauge becomes flush with the registration plate thereby indicating that the correct compression is achieved; (e) mounting a contoured impression die on a contoured tool head surface such that the impression die is centered and aligned; (f) mounting the tool head to a heat generating and heat supplying tool handle; (g) inserting a layer of thermally sensitive graphic marking material within the registration means window, so that the marking material is centered and smoothed, and such that the application surface is overlaid; (h) inserting the tool head within the registration means window to a controlled, predetermined depth, while the tool head is heated to a predetermined temperature, for a predetermined time period; (i) removing the tool head, the thermally sensitive graphic marking material, the clamp, and the registration plate.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for applying heat transfer graphics to vehicle seats and the like comprising the steps of:

(a) positioning a registration plate on an application surface such as an automobile seat, said registration plate defining a window for framing a portion of the application surface to receive heat transfer graphics;

(b) heating a tool head surface having an embossed design thereon;

(c) inserting a layer of thermally sensitive graphic marking material within said registration plate window such that the portion of the application surface to receive heat transfer graphics is overlaid;

(d) inserting said heated tool head within the registration plate window such that said embossed design contacts said graphic marking material;

(e) removing the said tool head, said thermally sensitive graphic marking material, and said registration plate, from said application surface, whereby a graphic design corresponding to said embossed design remains permanently affixed to said surface.

2. The method of applying heat transfer graphics to vehicle seats and the like according to claim 1, wherein a means for clamping is used to fasten said registration means to said application surface.

3. The method of applying heat transfer graphics to vehicle seats and the like according to claim 1, wherein said application surface is substantially rigid and flat.

4. The method of applying heat transfer graphics to vehicle seats and the like according to claim 1, wherein said application surface is a cushioned substrate.

5. The method of applying heat transfer graphics to vehicle seats and the like according to claim 4, wherein said application surface is natural leather.

6. The method of applying heat transfer graphics to vehicle seats and the like according to claim 4, wherein said application surface is synthetic leather.

7. The method of applying heat transfer graphics to vehicle seats and the like according to claim 4, wherein said tool head surface is concave.

8. A method for applying heat transfer graphics to vehicle seats and the like comprising the steps of:

(a) positioning a rigid registration plate on a cushioned application surface such as an automobile seat, said registration plate defining a registration window;

(b) securing said registration plate in place utilizing an adjustable clamping device;

(c) inserting a depth gauge within said registration plate window;

(d) adjusting the pressure exerted by the clamping device on the registration plate until said depth gauge is flushly disposed within said registration plate window;

(e) mounting an embossed design on a contoured tool head surface such that the embossed design is centered and aligned;

(f) mounting said tool head to a heat generating tool handle and heating said tool head;

(g) inserting a layer of thermally sensitive graphic marking material within said registration plate window such that the application surface within said window is overlaid;

(h) inserting said tool head within the registration plate window to a controlled, predetermined, depth, for a predetermined time period;

(i) removing said tool head, said thermally sensitive graphic marking material, said clamping means, and said registration means, from said application surface, whereby a graphic design corresponding to said embossed design remains permanently affixed to said application surface.

9. The method of applying heat transfer graphics to vehicle seats and the like according to claim 8, wherein steps (g) through (i) are repeated using marking material having a different color for producing multi-colored graphic design transfers.

* * * * *